(12) United States Patent
Welch et al.

(10) Patent No.: US 11,879,090 B2
(45) Date of Patent: Jan. 23, 2024

(54) METHOD TO ENHANCE THE SELF-SEALING OF WELL CEMENT LEAKAGE PATHWAYS USING A SMART GEL CEMENT ADDITIVE

(71) Applicants: Chevron U.S.A. Inc., San Ramon, CA (US); Triad National Security, LLC, Los Alamos, NM (US)

(72) Inventors: Nathan James Welch, White Rock, NM (US); Hakim Boukhalfa, Santa Fe, NM (US); Robert David Gilbertson, Los Alamos, NM (US); Rajesh S. Nair, Houston, TX (US); Deryck Edward Matthew Williams, Houston, TX (US); Timothy Leo Quirk, Fulshear, TX (US)

(73) Assignees: CHEVRON U.S.A. INC., San Ramon, CA (US); TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 17/816,760

(22) Filed: Aug. 2, 2022

(65) Prior Publication Data
US 2022/0389302 A1   Dec. 8, 2022

Related U.S. Application Data

(63) Continuation-in-part of application No. 17/070,608, filed on Oct. 14, 2020, now Pat. No. 11,486,223, (Continued)

(51) Int. Cl.
*E21B 33/14*   (2006.01)
*C09K 8/487*   (2006.01)
(Continued)

(52) U.S. Cl.
CPC .......... *C09K 8/487* (2013.01); *C04B 24/2688* (2013.01); *C04B 28/02* (2013.01); *E21B 33/14* (2013.01); *E21B 47/005* (2020.05)

(58) Field of Classification Search
CPC ....... C09K 8/487; E21B 47/005; E21B 33/14; C04B 24/2688; C04B 28/02
See application file for complete search history.

(56) References Cited

U.S. PATENT DOCUMENTS

| 3,749,172 A | 7/1973 | Hessert et al. |
| 4,569,393 A | 2/1986 | Bruning et al. |

(Continued)

FOREIGN PATENT DOCUMENTS

| EP | 1331262 A1 | 7/2003 |
| EP | 1384771 A1 | 1/2004 |

(Continued)

OTHER PUBLICATIONS

International Search Report issued in PCT/US2017/025827, dated Jun. 1, 2017, 3 pages, European Patent Office.

*Primary Examiner* — Silvana C Runyan
(74) *Attorney, Agent, or Firm* — King & Spalding LLP

(57) ABSTRACT

Embodiments of the disclosure include swellable smart gel sealants and methods of using smart gel sealants. In certain embodiments, the smart gel sealants reversibly swell when exposed to a certain trigger, such as carbonic acid and/or sulfuric acid. In specific embodiments, the smart gel is comprised within a cement composition.

18 Claims, 4 Drawing Sheets

Related U.S. Application Data which is a continuation-in-part of application No. 16/091,943, filed as application No. PCT/US2017/025827 on Apr. 4, 2017, now Pat. No. 10,988,663.

(60) Provisional application No. 62/319,630, filed on Apr. 7, 2016.

(51) Int. Cl.
*C04B 28/02* (2006.01)
*E21B 47/005* (2012.01)
*C04B 24/26* (2006.01)

(56) References Cited

U.S. PATENT DOCUMENTS

| | | | |
|---|---|---|---|
| 5,888,943 A | 3/1999 | Diggs et al. | |
| 9,546,533 B2* | 1/2017 | Baldasaro | C09K 8/50 |
| 9,856,415 B1* | 1/2018 | Leverson | C09K 8/64 |
| 9,951,261 B2* | 4/2018 | Nelson | C09K 8/467 |
| 2008/0139415 A1 | 6/2008 | Todd | |
| 2010/0065273 A1 | 3/2010 | Sawdon et al. | |
| 2011/0187556 A1* | 8/2011 | Roddy | E21B 47/12 |
| | | | 340/853.3 |
| 2012/0298354 A1 | 11/2012 | Sullivan | |
| 2013/0000900 A1 | 1/2013 | Kalgaonkar et al. | |
| 2014/0090895 A1* | 4/2014 | Daou | C09K 8/035 |
| | | | 166/305.1 |
| 2016/0115365 A1 | 4/2016 | Bulte-Loyer | |
| 2017/0138149 A1 | 5/2017 | Muthusamy et al. | |
| 2018/0037798 A1 | 2/2018 | Mishra | |

FOREIGN PATENT DOCUMENTS

GB 2524232 A 9/2015
WO WO 2015/126402 A1 8/2015

\* cited by examiner

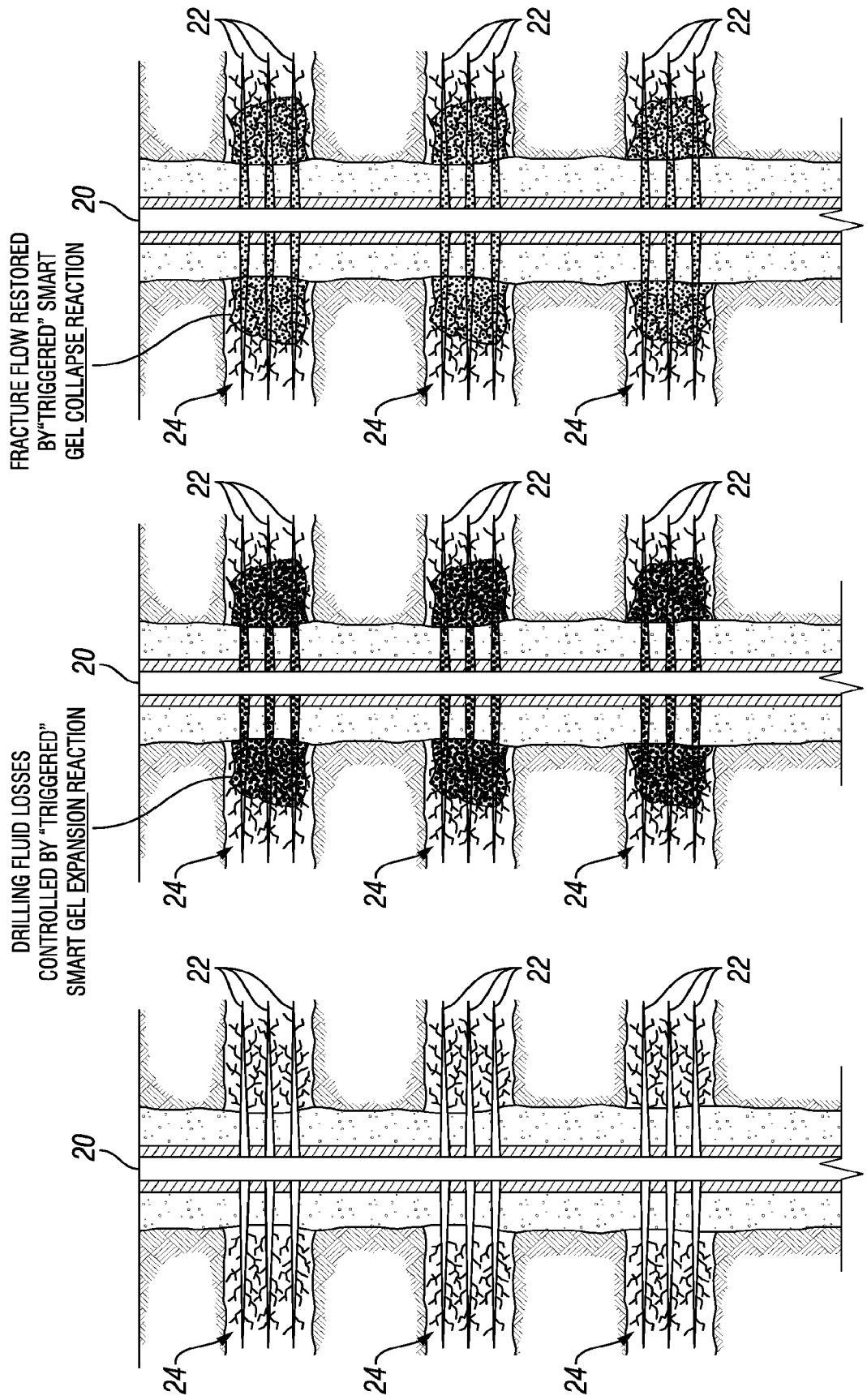

METHOD TO ENHANCE THE SELF-SEALING OF WELL CEMENT LEAKAGE PATHWAYS USING A SMART GEL CEMENT ADDITIVE

CROSS-REFERENCE TO RELATED APPLICATIONS

The present application is a continuation-in-part of and claims priority to U.S. application Ser. No. 17/070,608 filed on Oct. 14, 2020, which is a continuation-in-part and claims priority to U.S. application Ser. No. 16/091,943 filed on Oct. 5, 2018, which is a national phase application of PCT/US2017/25827 filed on Apr. 4, 2017, which claims the benefit of U.S. Provisional Patent Application No. 62/319,630, filed on Apr. 7, 2016. The forgoing applications are herein incorporated by reference in full.

The present application is a continuation-in-part of and claims priority to U.S. application Ser. No. 17/070,608 filed on Oct. 14, 2020, now U.S. Pat. No. 11,486,223, which is a continuation-in-part and claims priority to U.S. application Ser. No. 16/091,943 filed on Oct. 5, 2018, now U.S. Pat. No. 10,988,663, which is a national phase application of PCT/US2017/25827 filed on Apr. 4, 2017, which claims the benefit of U.S. Provisional Patent Application No. 62/319,630, filed on Apr. 7, 2016. The forgoing applications are herein incorporated by reference in full.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

STATEMENT REGARDING FEDERAL RIGHTS

The United States government has certain rights in this invention pursuant to Contract No. 89233218CNA000001 between the United States Department of Energy and TRIAD National Security, LLC for the operation of Los Alamos National Laboratory.

TECHNICAL FIELD

The present disclosure relates generally to methods to use triggerable swellable gel sealants, and more specifically to methods to use triggerable, swellable, gel sealants to enhance, maintain, or repair subsurface integrity within wells.

BACKGROUND

The safe, environmentally friendly, and cost efficient development of oil and gas resources as well as carbon sequestration is becoming increasingly complex. For example, deep water subsalt developments require fewer wells that must produce reliably over longer periods of time to justify the large capital expenditures necessary to develop them. Enabling technologies being developed focus on a wide range of applications along the entire value chain used to discover, recover, and transport high energy density resources to the consumer, as well as provide carbon sequestration opportunities. Given the additional time a well is required to produce or provide an adequate seal in the subsurface, additional complexities are added to maintaining the safe and cost effective maintenance of wells.

New compositions, methods, and systems are needed to enhance, maintain, or repair subsurface integrity within a well or near well bore region. For example, oil and gas producing wells typically experience high pressure and temperature conditions, which could lead to induced stresses on cemented annulii leading to potential containment loss, for instance, $CO_2$ and/or $H_2S$ leakage through microannuli (e.g. delaminations along the interface of steel and solid cement) or micro-fractures in the well system. The use of smart cement during the cementing operations could give an assurance to maintaining the integrity of the cement sheath as it undergoes induced stresses during the life of the well.

SUMMARY

An embodiment of the disclosure is a method for permanently sealing a leakage pathway in a well comprising, injecting into the well a cement composition comprising cement aggregate, water, and a triggerable gel composition having an untriggered size and comprising a polymer, wherein the polymer comprises an inert monomer, a practical monomer, and less than 1.5% by weight of a cross-linker, wherein when the triggerable gel composition is exposed to carbonic acid and/or sulfuric acid, the triggerable gel composition swells to at least ten times the untriggered size. In some embodiments, the triggerable gel composition comprises less than 2% by weight of the polymer. In some embodiments, the void is located in one of: a casing of an active well or cement in a plugged and abandoned well. The method can also further comprise injecting $CO_2$ and/or $H_2S$ into the well. In some embodiments, the inert monomer is one or more of methyl methacrylate, styrene, alkyl substituted styrenes, methyl acrylate, methacrylic and acrylic monomers, acryloyl nitrile, polyvinylpyrolidinone, and a substituted acrylamide, and the practical monomer is one or more of 2-(dimethylamino) ethyl methacrylate, vinyl pyridine, 2-(diethylamino) ethyl acrylate, 3-(dimethylamino) propyl acrylate, and acrylic acid. In specific embodiments, the inert monomer is 5-80% by weight of the triggerable gel composition and the practical monomer is 5-80% by weight of the triggerable gel composition. In additional embodiments, the cross-linker is one or more of ethylene glycol dimethacrylate, methylene bis-acrylamide, triethyleneglycol trimethacyrlate, and divinyl- or trivinyl benzene. In embodiments, the triggerable gel composition comprises gel particles with an average size between 10 nanometers and 150 micrometers prior to being triggered. In some embodiments, once the cement composition is cured to form a solid cement composition, the triggerable gel composition does not change the mechanical properties of the solid cement composition in triggered form. In some embodiments, the triggerable gel composition swells to at least 50 times the untriggered size when exposed to the carbonic acid and/or sulfuric acid. In additional embodiments, the triggerable gel particles within the triggerable gel composition are encapsulated. In specific embodiments, a permanent seal is formed within the leakage pathway by carbonate mineralization, such as calcium carbonate. In embodiments, the ratio of inert monomer to practical monomer is greater than 1:2.5, for example, 1:2.0, 1:1.5, etc.

Another embodiment of the disclosure is a method of cementing a wellbore during drilling operations comprising, drilling a section of a well, lowering a section of casing into the drilled section of the well, pumping down through the casing and up and around the casing into the annulus between the casing and the formation a cement composition comprising cement aggregate, water, and a triggerable gel composition having an untriggered size and comprising a polymer, wherein the polymer comprises an inert monomer, a practical monomer, and less than 1.5% by weight of a cross-linker, wherein when the triggerable gel composition is exposed to carbonic acid and/or sulfuric acid, the triggerable gel composition swells to at least ten times the untriggered size, and, performing a formation integrity test on the bottom of the cemented casing string. In some embodiments, the triggerable gel composition comprises less than 2% by weight of the polymer. The method can also further comprise injecting $CO_2$ and/or $H_2S$ into the well. In some embodiments, the inert monomer is one or more of methyl methacrylate, styrene, alkyl substituted styrenes, methyl acrylate, methacrylic and acrylic monomers, acryloyl nitrile, polyvinylpyrolidinone, and a substituted acrylamide, and the practical monomer is one or more of 2-(dimethylamino) ethyl methacrylate, vinyl pyridine, 2-(diethylamino) ethyl acrylate, 3-(dimethylamino)propyl acrylate, and acrylic acid. In specific embodiments, the inert monomer is 5-80% by weight of the triggerable gel composition and the practical monomer is 5-80% by weight of the triggerable gel composition. In additional embodiments, the cross-linker is one or more of ethylene glycol dimethacrylate, methylene bis-acrylamide, triethyleneglycol trimethacyrlate, and divinyl- or trivinyl benzene. In embodiments, the triggerable gel composition comprises gel particles with an average size between 10 nanometers and 150 micrometers prior to being triggered. In some embodiments, once the cement composition is cured to form a cured cement composition, the triggerable gel composition does not change the mechanical properties of the cured cement composition in triggered form. In some embodiments, the triggerable gel composition swells to at least 50 times the untriggered size when exposed to the carbonic acid and/or sulfuric acid. In additional embodiments, the triggerable gel particles within the triggerable gel composition are encapsulated. In specific embodiments, a permanent seal is formed within the leakage pathway by carbonate minerals, such as calcium carbonate. In embodiments, the ratio of inert monomer is greater than 1:2.5, for example, 1:2.0, 1:1.5, etc.

These and other aspects, objects, features, and embodiments will be apparent from the following description and the appended claims.

BRIEF DESCRIPTION OF THE DRAWINGS

The drawings illustrate only example embodiments of methods for using triggerable, swellable, gel sealants and are therefore not to be considered limiting of its scope, as triggerable, swellable gel sealants may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 2A, 2B, and 2C illustrate the use of smart gels in drilling induced fracturing.

DETAILED DESCRIPTION OF EXAMPLE EMBODIMENTS

Figure 1:
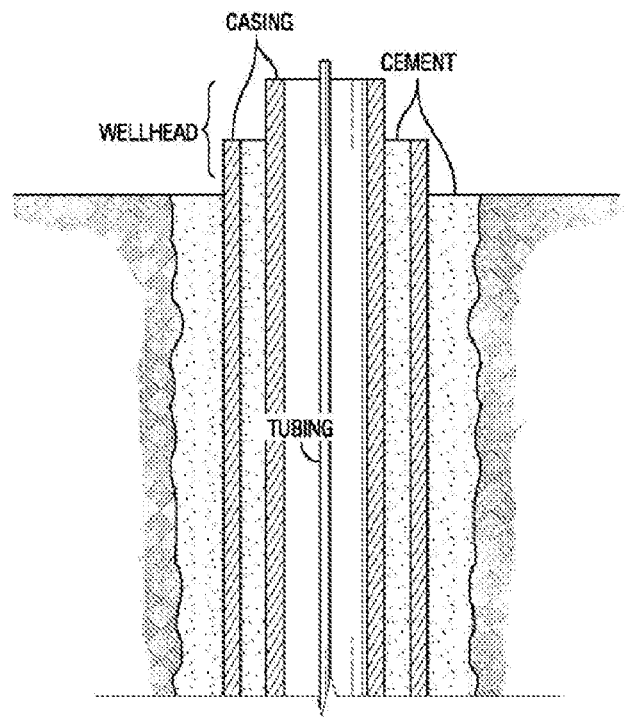
FIG. 1 is diagram of a well including the wellhead.

The example embodiments discussed herein are directed to methods of using triggerable swellable gel sealants, such as in smart cement compositions. While the examples shown in the figures and described herein are directed to use in a wellbore, examples of triggerable swellable gel sealants can also be used in other applications in a wellbore. Thus, the examples of triggerable, swellable, smart gel sealants described herein are not limited to use in the casing and cement sheath. For example, the reversible triggerable smart gels described here may also be used in other applications such as plugging voids in sand screens, and reversibly plugging near wellbore production zone voids during drilling, completion, production, and plugging of wells. Specific embodiments of the disclosure provide means to reversibly seal cased and cemented well systems that have lost containment.

The smart cement may be used to set temporary or permanent abandonment plugs in oil and gas or, carbon sequestration wells where a column of smart cement could be placed across selected intervals to achieve pressure isolation between different subsurface formations. The smart cement may also be placed on top of a mechanical plug made of cast iron or composite material in such applications. The smart cement used in temporary or permanent abandonment plugs may comprise the smart gel as a solid or as a liquid suspension along with water and other additives.

A nonlimiting example of a method for drilling an oil and gas well follows. A typical oil and gas well is drilled in sections of sequentially reduced hole size. Drilling a section is carried out by lowering a drill bit attached to the end of a drill string which is a series of connected drill pipes (also called joints). The hole is typically drilled by applying weight on the drill bit and rotating the drill string. Drilling fluid (mud) is pumped down the drill pipe and out of the nozzles in the drill bit as the hole is drilled and the drilled pieces of rock (also called cuttings) are circulated out of the hole as the drill bit progresses down to the planned depth to which the section is to be drilled. Once this depth is reached, the hole is cleaned by circulating the drilling fluid and the appropriate casing is run into the hole as a series of connected casing joints (also called casing string). In the case of deepwater wells, the casing may be lowered into the hole using drill pipe. The end of the casing string comprises a guide shoe and float collars that contain check valves to prevent the cement from flowing back into the casing once it is pumped and also to prevent wiper plugs from passing through. The wiper plugs are pumped down the hole along with the cement and wipe the inside of the casing so that a minimal quantity of mud comes into contact with the casing. The cement is pumped down the casing using a cement head that seats the bottom and top wipers. While pumping the cement down the casing, the cement is separated from the drilling mud by using liquid spacers that are compatible with both the drilling mud and the cement. The liquid spacer is pumped first, followed by the bottom wiper, lead cement, tail cement, top wiper followed by more liquid spacer. The spacer-bottom plug-lead-tail-top plug-spacer train is pumped down the casing string using the drilling fluid (mud). Once the bottom plug hits the check valves in the float collar, it ruptures and allows the lead cement and a designed portion of the tail cement to flow through the shoe and around the casing filling the annulus between the casing and the hole. The top wiper plug seats on the float collar and does not rupture. The top plug and the liquid spacer on top of it provides isolation between the mud and the cement as it cures. A portion of the tail cement remains inside the float collar and joints separating the float collar and the guide shoe (also referred to as the shoe track). Once the cement slurry attains sufficient shear strength so that it does not flow, the shoe track and 10-15 ft. of fresh formation is drilled and a formation integrity test is carried out to ensure the bottom of the cemented casing string will withstand the hydraulic pressure of the drilling mud that is required to keep the hole stable as the next section is drilled.

"Smart gels" or "triggerable gels," as used herein, refer to a class of polymer gels that swell upon sensing a specific trigger. The smart gel may also collapse when the trigger is removed. Triggers include, but are not limited to, pH, temperature, concentration of metal ions, and/or acoustic, electric, and/or magnetic stimuli. The swellable element within the smart gel swells to at least ten times the original size of the smart gel (size prior to trigger) when the trigger is applied.

As used herein, numerical values recited refer to values equal to the numerical value or values within the standard of error of measuring such values. The term "about," as used herein, refers to an amount that is within 3% of the value recited.

The term "inert monomer," as used herein, refers to a monomer within a smart gel polymer that does not respond to a triggering event.

The term "practical monomer," as used herein, refers to a monomer within a smart gel polymer that undergoes a physical and/or chemical transformation when exposed to a trigger.

The term "cross-linker," as used herein, refers to a di- or tri- or otherwise multi-functional monomer that causes cross-linkages to occur within the smart gel polymer.

The term "microannulus" or "microannuli" refers to annuli of less than 120 microns.

The term "void" as used herein is a section of a well that does not contain a solid, for example, only gas and/or liquid. For example a void could be a microannulus or a fracture, a fracture network, or a gap in a sand pack. A void could be located near wellbore in the formation caused from drilling, along the cement-formation interface, through fractures and void in the well cement, or along the cement-casing interface.

The term "smart cement" as used herein is a cured or uncured cement composition that comprises a smart gel.

Embodiments of the disclosure include a polymer comprising gel particles, referred to herein as "smart gels" or "triggerable gels," that are engineered to expand or collapse when triggered by an external stimulus. In embodiments, the smart gel particles are engineered to a designed particular size range so that they can be pumped as a suspension in an appropriate working fluid into voids, such as a microannulus in a cemented wellbore. FIG. 1 illustrates one embodiment of a well system. Voids can occur throughout the well system, for example within the wellhead, the cement, the tubing and the casing. The smart gel is emplaced into the voids in a collapsed state, where it remains until it is triggered to cause expansion, filling the voids. In embodiments, the gel expansion creates a reversible localized seal that reduces or eliminates liquid and gas flow within the targeted void. If desired, the flow within the void can be restored by collapsing the smart gel by reversing the trigger. Embodiments of this disclosure relate to the use of swellable triggerable gel sealants to mitigate gas leakage from well casings. In some embodiments, there is no cement within a working fluid in which the triggerable gel is suspended within. That is, cement is not found suspended within the working fluid in an effective amount (effective amount being an amount of cement needed to set into a solid).

In embodiments of the disclosure, once the gel is triggered it swells to seal void areas. The triggering event may also crosslink the practical monomers within the gel. In embodiments of the disclosure, the packing of the swollen particles and the cross-linkage strength of the individual swollen particles should be able to withstand the pressure from the formation and any fluids or gasses entering or exiting the sealed area. In some embodiments, exposure to the trigger can result in swelling ratios that may vary from a factor of 10 up to a factor of 100, such as from 10-60, 31-60, 10-20, 21-40, 41-60, 11-20, 21-30, 31-40, 41-50, 51-60, 61-70, 71-80, 81-90, and 91-100 times the unswollen smart gel particle size. In embodiments of the disclosure, the amount of swelling of the smart gels is controllable via their polymer chemistry and may be adjusted for specific applications.

In embodiments of the disclosure, the gels can be designed to be triggered by pH, $CO_2$, $H_2S$, temperature, ionic strength, or concentration of metal ions such as calcium, acoustic waves, magnetic, heat, pressure change, or electric fields, for example. Triggering fluids or gasses could be injected, or physical changes could also be induced by specific instruments. In a specific embodiment, the gels are triggered to expand by a low pH trigger. The polymers may be designed so that the functional groups within the polymer (example: tertiary amines) react with the bicarbonate anions to form a complex through hydrogen bonding NH+ . . . —$O_3$CH which crosslinks the polymer and increases its viscosity. This process can be reversed by disrupting the hydrogen bond network by increasing the pH, which causes the deprotonation of the bicarbonate anion and the tertiary amine groups, for example. Smart gels may also be engineered such that they can be triggered by other stimuli including brine concentration, acoustics, specific ion recognition, and thermal changes. One or more of these stimuli may be preferential in a given situation. For example, the smart gel can be formulated to be in solution in a base composition at a higher pH than 7. Dropping below a pH of 6.3 could then trigger the swelling and/or crosslinking of the polymer within the smart gel. In additional embodiments of the disclosure, the trigger is reversible. For example, if the pH is again raised to be higher than 7 the smart gel shrinks to smaller than its swollen size. The smart gel can then be removed from the voids or left in place.

In embodiments of the disclosure, the polymer smart gels comprise a mixture of hydrophobic monomers as well as co-monomers that are equipped with functional groups that can be triggered to initiate cross linking or swelling in the smart gel. The practical monomer, inert monomer, and the crosslinker are all polymerized prior to injection. In some embodiments, smart gels may be colloidal particles that are hydrophobic in nature. In some specific embodiments, when exposed to a trigger, such as low pH, the amine group in colloidal hydrophobic particles becomes charged, which, in turn, can make the particles hydrophilic in nature. The smart gels can be synthesized by emulsion polymerization, which generates spherical particles. Examples of smart gels for use in embodiments are polymer microspheres with a random copolymer backbone comprising one co-monomer which is inert with respect to the triggering stimulus (herein referred to as an "inert monomer") and another co-monomer that undergoes a chemical or physical change in response to the stimulus (herein referred to as a "practical monomer"), which initiates swelling of the smart gel. In some embodiments, a fluorescent tag or non-fluorescent dyes are added to the gel in order to visualize the smart gel during experiments. The inert monomer and the practical monomer can be added to the smart gel in ratios of about 2:1-1:2.5, for example about 1:2.5, 1:2, 1.1:1, 1.2:1, 1.3:1, 1.4:1, 1.5:1, 1.6:1, 1.7:1, 1.8:1, 1.9:1, 2:1, 1:1.1, 1:1.2, 1:1.3, 1:1.4, 1:1.5, 1:1.6, 1:1.7, 1:1.8, 1:1.9. In some embodiments, the ratio of inert monomer and practical monomer is greater than 1:1.25, for example 1:1.2, 1:1, etc. The ratios of inert to practical monomers can affect how much the smart gel swells when triggered. For example, the higher the ratio of inert monomer to practical monomer, the less the smart gel swells. The higher the ratio of practical monomer to inert monomer, the more the smart gel swells. Further, increasing the concentration of cross-linker will lead to less swelling. In this way, the smart gel can be tailored to specific applications. A specific smart gel embodiment is given below in Table 1. In this embodiment the smart gel comprises methyl methacrylate as the inert monomer, 2-(dimethylamino) ethyl methacrylate as the practical monomer, 2-naphtyl methacrylate as a fluorescent tag, and ethylene glycol dimethacrylate as the cross-linker.

vinylpyrolidinone), and/or other substituted acrylamides. Inert monomers can be included in the polymer of the smart gel at concentrations of 5-80% of the polymer. For example, the inert monomer can be at concentrations of 5-40%, 40-80%, 5-25%, 25-50%, 50-80%, 5-15%, 15-25%, 25-35%, 35-45%, 45%-55%, 65-75% or 75-80% by weight of the polymer.

For pH, $H_2S$, and $CO_2$ triggerable gels the practical monomers include vinyl pyridine, 2-(dimethylamino)ethyl acrylate, 2-(diethylamino)ethyl acrylate, 3-(dimethylamino) propyl acrylate or similar acrylic and pyridine based monomers, and/or acrylic acid. Embodiments including acrylic acid could produce a pH triggerable gel which would swell with high pH and shrink with low pH. Embodiments of temperature triggerable gels practical monomers include N-isopropylacrylamide. For ionic concentration triggerable gels, embodiments of the practical monomers include vinylimidazole or substituted versions thereof. For example, you could have 18-crown-6 substituted monomers to swell with potassium, or 15-crown-5 for sodium, etc. Practical monomers can be included in the smart gel polymer at 5-80% by weight of the smart gel polymer. For example, the practical monomer can be added at concentrations of 5-40%, 40-80%, 5-25%, 25-50%, 50-80%, 5-15%, 15-25%, 25-35%, 35-45%, 45%-55%, 65-75% or 75-80% by weight of the smart gel polymer.

To form the smart gel the copolymers can be cross-linked with a di-functional monomer such as ethylene glycol dimethacyrlate, methylene bis-acrylamide, triethyleneglycol trimethacyrlate, divinyl- or trivinyl benzene, or other multi-functional monomers. The copolymers may be cross-linked

TABLE 1

Example components of a smart gel

| Monomer | Role in Smart Gel Particle | Chemical Structure |
|---|---|---|
| Methyl methacrylate | Primary constituent of polymer chains (inert) | 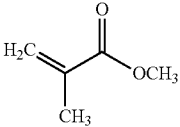 |
| 2-(Dimethylamino) ethyl methacrylate | pH-sensitive constituent of polymer chains (practical) | 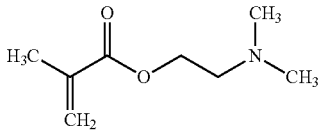 |
| 2-Naphtyl methacrylate | Fluorescent tag for experimental visualization | 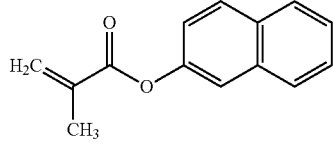 [SMILES: C=C(C)C(=O)Oc1ccc2ccccc2c1] |
| Ethylene glycol dimethacrylate | Cross-linker | 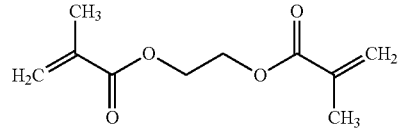 |

Examples of monomers that are inert with respect to the triggering event are styrene, alkyl substituted styrenes, methyl methacrylate, methyl acrylate or other similar methacrylic and acrylic monomers, acryloyl nitrile, PVP (polyat a low level, such as with a concentration of cross-linker of less than 1%, to produce a lightly cross-linked gel with the ability to expand in volume significantly by taking up water, for example. The cross-linker can be included in the polymer of the smart gel in concentrations of less than 2%, less than 1.5%, less than 1%, less than 0.9%, less than 0.8%, less than 0.7%, less than 0.6%, less than 0.5%, less than 0.4%, less than 0.3%, less than 0.2%, and less than 0.1% of the polymer. For example, the concentrations of cross-linker can be 0.01-1.5%, 0.5-1.5%, 0.01-1%, 0.01-0.5%, 0.5%-1%, 0.01-0.3%, 0.3%-0.6%, 0.6%-1%, 0.01-0.1%, 0.1-0.2%, 0.2-0.3%, 0.3-0.4%, 0.4-0.5%, 0.5-0.6%, 0.6-0.7%, 0.7-0.8%, 0.8-0.9%, 0.9-1% by weight of the polymer.

In embodiments of the disclosure, the polymer of the smart gel is prepared by emulsion polymerization and the particle size can be controlled by surfactant and co-surfactant choice as well as monomer concentration. Variation of the monomer ratios in the initial reaction mixture results in smart gels that contain corresponding amounts of pH sensitive monomer in the back bone of the polymers and can be used to control the amount of swelling the smart gel undergoes. The reaction results in an emulsion which can be used as produced if desired or the microspheres can be separated by centrifugation and washed to eliminate the surfactants and any unreacted monomers. Suspensions of the separated microspheres can be prepared to the desired concentration in the injection/working fluid. The suspension compositions can be tailored to contain a narrow particle size or a broad range of particle size distribution based on the application.

In embodiments of the disclosure, the smart gel is comprised within a working fluid. Previous percentages listed in relation to the concentrations of monomers and cross-linkers within the polymer of the smart gel are exclusive of the concentration of working fluid. In embodiments, the working fluid may be water, brine, and/or a drilling fluid. The smart gel may comprise between 1-50% by weight of the working fluid. For example, the smart gel may comprise 1-25 wt %, 25-50 wt %, 1-10 wt %, 11-20 wt %, 21-30 wt %, 31-40 wt %, 41-50 wt % of the working fluid. The working fluid may be formulated to better distribute the smart gel into voids meant to be sealed by the smart gel. The trigger may also be comprised within a working fluid such as water or brine. In some embodiments, there is no cement that is contained within a working fluid in which the triggerable gel composition is comprised. That is, in embodiments, any cement within the well has already been set into a solid, and cement is not found suspended within the injection fluid in an effective amount (effective amount of cement being an amount of cement needed to set into a solid).

In embodiments of the disclosure, the smart gel is injected into voids in a well where they reside until they experience a trigger. The trigger may be externally applied, such as through a fluid injection, or can be an internal trigger, such as temperature change within the formation. One type of void is a microannulus. The microannulus can occur in a wellhead, in solid cement, in casing, or in tubing, for example. The trigger can be pH, $CO_2$, $H_2S$, temperature, ionic strength, or so forth. The smart gel can experience the trigger when a trigger fluid is pumped into the voids where the smart gel resides. For example, if the trigger is high to low pH, the smart gel would reside in a fluid that has a higher pH, and the trigger fluid would have a lower pH. Further, the trigger can also be present in the well prior to injection of the smart gel into the well. That is, the trigger could be sourced into the well prior to injection of the smart gel or the trigger could be native to the well. For example, $CO_2$ and/or $H_2S$ can decrease the pH of fluids they are exposed to. If $CO_2$ and/or $H_2S$ comes in contact with a smart gel in a void, the $CO_2$ and/or $H_2S$ can then cause a high to low pH change, triggering the smart gel to swell. A high to low or low to high pH triggered smart gel can be designed to be triggered at different pH. For example, the pH triggered smart gel can be triggered at between 5-8 pH, such as 5-6 pH, 6-7 pH, or 7-8 pH values. A specific embodiment of the disclosure is a high to low triggered reversible smart gel that swells to greater than 50× its original size when the pH drops from above 7 to the range between 6-7 pH, for example about 6.3. In a specific embodiment of this disclosure these pH-triggered reversible smart gels retain their swelling and collapsing properties at a temperature range from about 22° C. to no less than 70° C.

In embodiments of the disclosure, the trigger is temperature. For example, the trigger can be going from a high temperature to a lower temperature or a lower temperature to a higher temperature. In certain embodiments, the temperature trigger is between about 30 to 60° C. In other embodiments of the disclosure, the trigger is the concentration of certain ions. For example, the trigger could occur going from high to low concentration of ions in solution or from low to high concentration of ions in solution. For example, the smart gel could be comprised in water with low total dissolved solids and swells when it comes into contact with brine, or vice versa.

Smart gels can be tested to determine the conditions of swelling, for example, the pH range in which the gel swells, the amount of swelling and the particle size distribution, for example. Gels can be tested in a microfluidic flow assembly. Further testing can be done in microfluidic channels, such as microfluidic channels in glass or the channels 30 in solid cement seen in FIG. 3. A solid cement channel can be formed in a small cement block constructed of the same type of cement used in the well. The smart gel can then be injected into the cement channel, triggered, and measurements can be made to determine effectiveness of the gel seal. Measurements can include differential pressure, such that the strength of the plug formed by the smart gel is quantified. The gels can also be tested at different temperatures, in different materials, and under differing chemical conditions to determine the effects of these variables on gel performance. The smart gel may also include a fluorescent tag or visual dye to enhance visualization.

In addition to sealing voids or channels in the well-head, the smart gel may be used in other applications. For example, the smart gel can be used to seal void areas in a sand screen. When a sand screen is packed with sand, if not done properly, large void areas can occur. These sand screens with large void areas are not as efficient at screening out particles as properly packed sand screens. Without sealing, water, fluids, and oil can flow at a high velocity through the voids in the sand screen, which enhances erosion of the screen. In some instances, once the large voided areas within a sand screen are plugged by the smart gel, the swelling could be partially reversed by changing the trigger. That is, once the gel is swelled, a reverse trigger could be applied in a limited amount such that the gel only partially returns to its pre-swelled condition. In this way, some larger voids may still comprise a large amount of gel, but in the areas with smaller voids, the thin layer of gel would be removed such that the permeability of the sand pack is maintained while maintaining a gel plug in the void area.

In other embodiments, the smart gel is used to seal drilling induced voids in producing zones while drilling is occurring. Drilling a wellbore 20 through production zones can cause fracturing 23 to occur in the production zones 24 (FIG. 2a, for example). These fractures 23 or voids can be in communication with the wellbore and, if not sealed, drilling mud and fluids can leak from the wellbore into the production zones clogging the zones. Sealing production zone voids with a smart gel would allow drilling fluids to still circulate up and down within the wellbore without allowing the drilling fluids to plug the production zone (FIG. 2b). After drilling is complete, the smart gel seals could be reversed and the voids cleaned, which would reestablish access to the production zones (FIG. 2c). In embodiments of the disclosure the smart gel size, surface properties, swelling, and crosslinking would be tailored to each application. In embodiments of the disclosure, the smart gel is reversible. That is, reversing the trigger event will cause the smart gel to shrink. For example, if going from above a 6.3 pH to below a 6.3 pH causes the smart gel to swell, going from below 6.3 pH to above 6.3 pH will cause the smart gel to shrink.

In other embodiments, the smart gel is used to seal well annuli in order to prevent migration of gas through and/or between the casing and solid cement, or solid cement and host rock. In embodiments, annular migration is indicated by sustained casing pressure in the annulus.

In some embodiments, the smart gel is used within a plugged and abandoned well. Some plugged and abandoned wells can be subject to a barrier failure through which gasses could leak, which, due to lack of accessibility are difficult to localize, access, and mitigate by standard techniques. In embodiments, the smart gel can be pumped into a porous zone through an adjacent well and triggered to seal both wells. In some embodiments, a pilot hole is drilled through the plugged well solid cement and the smart gel is pumped through the hole and triggered. In another embodiment, an image assisted small bore relief well is drilled in order to deliver the smart gel into a sealed well below the plug and then to trigger the smart gel.

In some embodiments, the smart gel is used to enhance top seal integrity of a reservoir near the wellbore (e.g., damaged by drilling and completion). For example, some reservoir top seals are damaged near the wellbore, which can limit injection operating pressures or rates. Sealants emplaced prior to injection can enhance the top seal or repair known breaches near the wellbore. In some embodiments, the smart gel is less dense than the liquid within the reservoir thereby allowing control of the sealant plume.

In embodiments of the disclosure, specific properties of the triggerable gels are considered when designing a gel for a certain application. The properties of the gels can be modified to fit certain applications which can include particle size prior to triggered swelling, surface properties such as polarity, hydrophobicity, charge prior to swelling, amount of swelling after being triggered, strength of the gel after swelling, and the type of trigger. For example, given a specific casing composition and assumed or measured microannulus size, the smart gel can be tailored to the microannulus and casing composition such that the smart gel enters the microannulus efficiently. In an embodiment, the average size of the smart gel prior to swelling can be less than the size of the microannulus, thus, assisting distribution within the microannulus. In embodiments of the disclosure, the average size of the smart gel microsphere is between 10 nanometers to 200 micrometers. In specific embodiments of the disclosure, the average size of the gel microspheres is 10 nanometers to 5 micrometers, 10 nanometers to 1 micrometer, 10 nanometer-500 nanometers, 500 nanometers-1 micrometer, 10 nanometers-300 nanometers, 300 nanometers-600 nanometers, 600 nanometers-1 micrometer, 10 nanometers-500 nanometers, 500 nanometers-1 micrometer, 10 nanometers-4 micrometers, or 10 nanometers-999 nanometers. In specific embodiments of the disclosure, the average size of the gel microspheres is 5-50, 50-100, 100-150, or 150-200 micrometers. In embodiments, the average size of the gel microspheres is 5-25, 25-50, 50-75, or 75-100 micrometers. In embodiments, the maximum average size of a microsphere is 100 micrometers. In embodiments, the smart gel is designed for a very narrow aperture of microannuli. In embodiments, the smart gels are used where conventional mitigation approaches (e.g., cement squeezes, commercial sealants) would be ineffective.

As indicated above, in embodiments of the disclosure the average gel particle size is tailored to a specific application. For example, the smart gel is tailored to the size regime of the voids, such as cracks and/or pores in the reservoir, so that one can manipulate a synthetic variable to control the size and distribution of the smart gel polymer so that optimal flow of the suspension into the voids can be achieved. Embodiments include conducting experiments using a microfluidic cell and microscopic visualization and image analysis system to quantify the relationships among microannulus aperture distribution, particle size distribution and particle surface properties. For example, the particle size distribution of gel particles is a consideration in that the particles can be sufficiently small to flow through the microannulus network and yet be sufficiently large enough to seal the microannulus upon swelling. Flow through experiments using a custom microfluidic cell with engineered channels has shown flow characteristics of specific gel particles. Gel particles used in the experiment were angular, blocky and ranged from equidimensional to aspect ratios typically less than 2:1 (longest dimension:shortest dimension). In embodiments of the disclosure, the gel particle size may be designed to be 0.05-0.25 times the width of the microannulus network, as shown in the flow through experiments. For example, if the microannulus is 100 micrometers, the size of the gel particles can be 5 micrometers to 25 micrometers. Similar calculations can be done for other types of voids. In some embodiments, the average particle size is about two times the mean diameter of the average size of microannulus.

In one embodiment of the disclosure, smart gel sealant activation trigger design is application specific. In certain example embodiments, $CO_2$ and/or $H_2S$ can be used as the gel trigger. In other example embodiments, a $CO_2$ and/or $H_2S$ seal-sensitive trigger design can be controlled by pH. Smart gel triggers can be designed to activate via external stimuli such as through a trigger that is pumped into the well. The trigger may also be an internal trigger from the well, such as the presence of $CO_2$ and/or $H_2S$ which can reduce the pH, an internal temperature change, or the like. The gels expand upon sensing the $CO_2$, $H_2S$ and/or other pH trigger and collapse on the removal of the trigger. The gel trigger may also be reversible, for example, the gel viscosity can increase or decrease upon responding to the trigger. Additionally, triggering could be through exposure to molecular $CO_2$ (no water), $H_2S$, carbonic acid, sulfuric acid ($CO_2$ and/or $H_2S$ dissolving in water to reduce pH) and/or simply acidity (e.g., souring that commonly occurs in water floods).

In embodiments of the disclosure, the smart gel is used to seal voids that are in contact with or near the wellbore region. The voids may be fractures, microannuli, voids in a sand screen, cracks, or the like. Voids can form leakage pathways through which fluid can flow. The area near the wellbore region could be a region that is within 20 meters of the wellbore, within 10 meters of the wellbore, within 7 meters of the wellbore, within 5 meters of the wellbore, within 3 meters of the wellbore, within 2 meters of the wellbore, within 1 meter of the wellbore, or within 0.5 meters of the wellbore. In embodiments, the leakage pathways are less than 400 µm in diameter. In embodiments, the leakage pathways are microcannulas.

Example embodiments allow for more efficient sealing of void areas within a well. Using example embodiments can provide significant cost savings, a higher level of reliability, easier installation, and easier maintenance of wells.

Void Sealing Cement

Improper cementing, difficult cementing conditions, or changes in well system stresses often lead to the formation of voids which can form leakage pathways in the portions of wells comprising cement. These leakage pathways allow for the migration of fluids through the cemented regions. In carbon sequestration wells, carbon dioxide can saturate the aqueous phase that comprises a majority of the fluid within a leakage pathway or in the target formation. The acidic solution formed from water and carbon dioxide solution will begin to dissolve the cement at the beginning or inlet of the leakage pathway, thereby widening the leakage pathway and increasing flow. As the fluid flows along the leakage pathway, calcium hydroxide formed from the curing of the cement can begin to increase the pH of the fluid. Carbonate minerals, such as calcium carbonate, will begin to precipitate if the pH becomes high enough.

Embodiments of the disclosure include a composition comprising cement, water and other additives and small amounts of a triggerable gel composition comprising a highly expandable triggerable polymer. In embodiments, the cement composition comprises water when the cement composition is in its uncured and liquid state. In embodiments the highly expandable triggerable polymer is triggered by an acid such as carbonic acid and/or sulfuric acid. The incorporation of the triggerable polymer in well cement composition promotes the self-sealing and permanent mineralization of leakage pathways that otherwise could require remediation of the well. However, in embodiments, including small amounts of the triggerable polymer in the cement composition does not change the mechanical profile of the cement when the polymer is in either triggered or untriggered form. For example, the smart gels can be added to the cement blend as a solid as a percent by the weight of cement (% BWOC) up to 3%) or as a liquid up to 7.5 wt % (smart gel suspended in water).

If flow begins to occur along a leakage pathway in the polymer-enhanced cement, dissolution of the cement occurs near the inlet of the leakage pathway from the flow of low pH solutions. However, with the polymer-enhanced cement, dissolution of the cement releases polymer particles into the leaking fluid. The polymer particles begin to swell when exposed to carbonic acid and/or sulfuric acid. The polymers also begin to adsorb $CO_2$ and/or $H_2S$ thereby saturating the available amine groups of the polymer. This $CO_2$ and/or $H_2S$ storage capacity of the polymer allows for a significant uptake of carbon dioxide beyond the saturation concentration of water. The swelling of the polymer increases the viscosity of the leaking fluid slowing the flow of the leak. Viscosity changes can be observed within 1-2 minutes of pH change. As the flow rate of the leaking fluid decreases from the increase in viscosity, the pH begins to rise more rapidly for a unit length due to the increased residence time in contact with the cement. Calcium carbonate then begins to form in the leakage pathway due to the increase in pH. Additional available $CO_2$ and/or $H_2S$ that was previously adsorbed onto the polymer will then slowly release as the aqueous concentration of carbon dioxide decreases from the formation of calcium carbonate. This continues to encourage the gradual formation of a calcium carbonate in the leakage pathway, which can occur within hours of leakage pathway formation. This mineralization seal process provides a permanent mineralized subsurface seal that is stable over geologic timeframes.

Several other processes have the potential of releasing sealing polymer particles that can reduce or eliminate fluid flow through the leakage pathways of a well's cement. Mechanical damage to the polymer enhanced cement can release the entrained polymer particles in leakage flow paths that form within the cement. Shearing of the interface between the cement annulus and well casing or the rock formation-borehole wall will also cause the release of leakage pathway sealing particles, as the cement material is ground against the rock or metal.

In some embodiments, calcium chloride is included in the cement composition along with the triggerable gel polymer. Including calcium chloride in the cement composition increases the calcium cations available in the cement system to enhance additional calcite formation over a longer period of time compared to the calcium available in neat cement (neat cement defined as a cement that has no additives to modify its setting time or rheological properties). In embodiments, the inclusion of the triggerable gel polymer does not affect the viscosity of the cement slurry. In embodiments, the inclusion of the triggerable gel polymer does not affect the cured cement compositions mechanical strength before and/or after the triggerable gel polymer has been triggered. In some embodiments, the well can be monitored for polymer swelling (vibrations from polymers expanding quickly) as an early warning of gas leakage. In embodiments, $CO_2$ and/or $H_2S$ is injected into a well in order to produce carbonic acid and/or sulfuric acid, which in turn triggers polymers located in cement proximate to a void or leakage pathway of the well. Examples of such wells are natural gas wells and hydrogen storage wells. The cement composition can also be used in well annuli between casing, liners, and rock formations. In embodiments, the cement composition can be used in damaged formation zones and/or isolation zones. In embodiments, the triggerable gel polymer is triggered in an aqueous only environment.

In embodiments, the cement composition additionally comprises water, leading to a liquid cement slurry composition (uncured state). The liquid cement composition can be prepared on the surface of a well site prior to injection into the well. Alternatively, the composition can be created by co-injection of a stream comprising the cement slurry lacking the polymer and a stream comprising the triggerable gel composition. The co-injection approach can provide control of gel location and concentration in the subsurface well. In embodiments, the triggerable gel polymer can be mixed directly into a well cement, or a dry cement additive can be prepared by powdering the polymer. Once in place, the liquid cement composition will cure according to the cement design specifications with no alteration from the polymer particles. Once cured, the mechanical properties of the polymer-enhanced cement will be unchanged compared to a non-enhanced cement.

In embodiments of the disclosure, smart cement comprises a pumpable mixture of cementitious material, smart gels, water and other additives. The smart gels can be added to the cement blend as a solid as a percent by the weight of cement (% BWOC) up to 3%) or as a liquid up to 7.5 wt % (smart gel suspended in water). When mixed as a pumpable mixture the cement slurry can be pumped down the casing and up into the annulus between the outer surface of the casing and the formation (casing by open hole). As placed, the cement slurry would then dehydrate to a set hardened cement sheath.

Embodiments of the triggerable gel composition include all of the compositions previously described in this disclosure, but they are added into a cement composition comprising cement aggregate. The triggering event may also crosslink the practical monomers within the gel. In specific embodiments of the disclosure, the packing of the swollen polymer particles and the cross-linkage strength of the individual swollen polymer particles are able to withstand the pressure from the formation and any fluids or gasses entering or exiting the sealed area. In some embodiments, exposure to the trigger can result in swelling ratios that may vary from a factor of 10 up to a factor of 100 times the unswollen polymer particle size. In embodiments of the disclosure, the amount of swelling of the triggerable gels is controllable via their polymer chemistry and may be adjusted for specific applications.

As described above the triggerable gel, or smart gel, comprises a practical monomer, an inert monomer, and a crosslinker. The inert monomer and the practical monomer can be added to the smart gel in ratios of about 2:1-1:2.5, for example about 1:2.5, 1:2, 1.1:1, 1.2:1, 1.3:1, 1.4:1, 1.5:1, 1.6:1, 1.7:1, 1.8:1, 1.9:1, 2:1, 1:1.1, 1:1.2, 1:1.3, 1:1.4, 1:1.5, 1:1.6, 1:1.7, 1:1.8, 1:1.9. In specific embodiments the inert monomer and the practical monomer can be added to the smart gel in a ratio of greater than 1.2, for example, the ratio is 1:1, 1:1.2, 1:1.4, 1:1.6 1:1.8, 1:2, 1:2.2, or 1:2.4.

All percentages for elements included in the triggerable gel composition given below are by weight in a liquid cement composition comprising aggregate, water, and a triggerable gel composition, unless noted.

Examples of monomers that are inert with respect to the triggering event are styrene, alkyl substituted styrenes, methyl methacrylate, methyl acrylate or other similar methacrylic and acrylic monomers, acryloyl nitrile, PVP (polyvinylpyrolidinone), and/or other substituted acrylamides. Inert monomers can be included in the polymer of the smart gel at concentrations of 5-80% of the polymer. For example, the inert monomer can be at concentrations of 5-40%, 40-80%, 5-25%, 25-50%, 50-80%, 5-15%, 15-25%, 25-35%, 35-45%, 45%-55%, 65-75% or 75-80% by weight of the polymer.

Examples of practical monomers include vinyl pyridine, 2-(dimethylamino)ethyl acrylate, 2-(diethylamino)ethyl acrylate, 3-(dimethylamino)propyl acrylate or similar acrylic and pyridine based monomers, and/or acrylic acid. Embodiments including acrylic acid could produce a pH triggerable gel which would swell with high pH and shrink with low pH. Practical monomers can be included in the smart gel polymer at 5-80% by weight of the smart gel polymer. For example, the practical monomer can be added at concentrations of 5-40%, 40-80%, 5-25%, 25-50%, 50-80%, 5-15%, 15-25%, 25-35%, 35-45%, 45%-55%, 65-75% or 75-80% by weight of the smart gel polymer.

To form the smart gel, the copolymers can be cross-linked with a di-functional monomer such as ethylene glycol dimethacyrlate, methylene bis-acrylamide, triethyleneglycol trimethacyrlate, divinyl- or trivinyl benzene, or other multi-functional monomers. The copolymers may be cross-linked at a low level, such as with a concentration of cross-linker of less than 1%, to produce a lightly cross-linked gel with the ability to expand in volume significantly by taking up water, for example. The cross-linker can be included in the polymer of the smart gel in concentrations of less than 1.5%, less than 1%, less than 0.9%, less than 0.8%, less than 0.7%, less than 0.6%, less than 0.5%, less than 0.4%, less than 0.3%, less than 0.2%, and less than 0.1% of the polymer. For example, the concentrations of cross-linker can be 0.01-1.5%, 0.5-1.5%, 0.01-1.2%, 0.01-0.5%, 0.5%-1%, 0.01-0.3%, 0.3%-0.6%, 0.6%-1%, 0.01-0.1%, 0.1-0.2%, 0.2-0.3%, 0.3-0.4%, 0.4-0.5%, 0.5-0.6%, 0.6-0.7%, 0.7-0.8%, 0.8-0.9%, 0.9-1% by weight of the polymer.

An embodiment of the disclosure is a cement composition comprising cement aggregate and a triggerable gel. In embodiments, a liquid cement composition additionally includes water. In embodiments, the liquid cement composition is pumped downhole in order to form a solid in the annulus between the formation (open hole) and a well casing. In embodiments, the triggerable gel comprises less than 5%, less than 4%, less than 3%, less than 2%, or less than 1% by weight of the cement composition which includes water. In embodiments, the triggerable gel composition comprises less than 3% (by weight) of the cured cement composition. In embodiments, the cement composition comprises cement aggregate, water, and a triggerable gel composition having an untriggered size and comprising a polymer, wherein the polymer comprises an inert monomer, a practical monomer, and less than 3% by weight of a cross-linker, wherein when the triggerable gel composition is exposed to carbonic acid and/or sulfuric acid, the triggerable gel composition swells to at least fifty times the untriggered size, and wherein the triggerable gel composition comprises less than 2% by weight of polymer.

Encapsulation of individual or small packets of multiple polymer particles can enhance the longevity of the polymer for extended periods in harsh subsurface environments. In some embodiments, the triggerable gel polymer is encapsulated in order to prevent early release of the triggerable gel polymer. Examples of encapsulation methods include glass microspheres, wax, resin, polyurethane, gelatin, cellulose, and polysaccharides, with or without glycerin or sorbitol additives for hardness. In embodiments, the encapsulation method is a coating element that degrades in low pH.

Embodiments of the disclosure include the addition of fluorescent and pH sensitive dyes which can allow for the observation of the location and local carbonic acid environment of the particles, for example. Embodiments of the disclosure could incorporate radioactive isotopes as a tracer, which would enable tracing of fractures.

EXAMPLE

Figure 4:
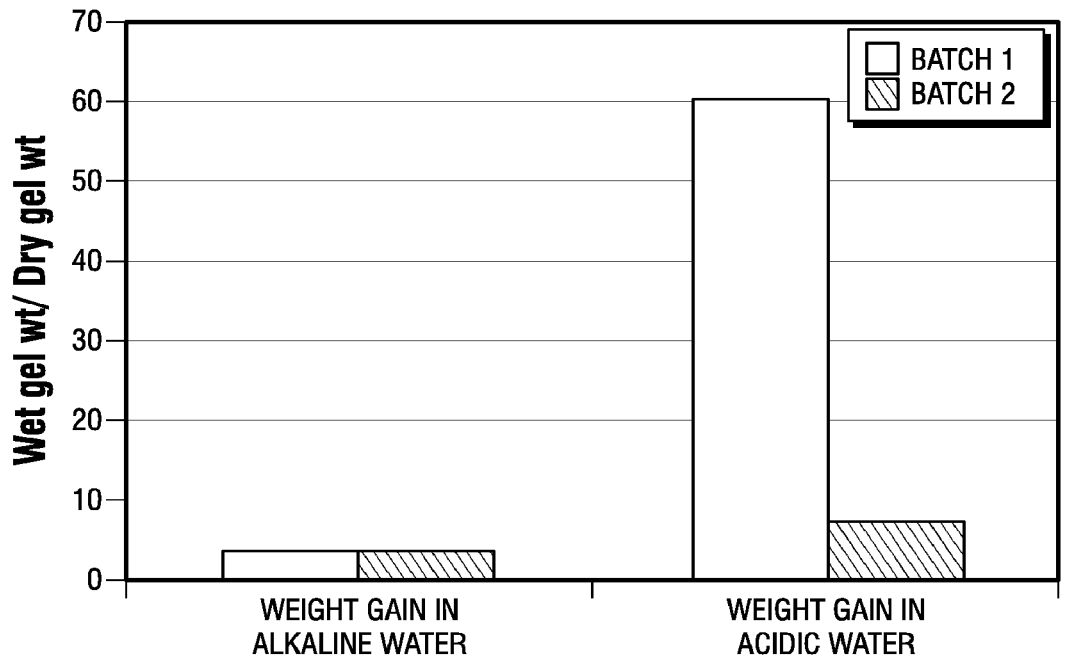
FIG. 4 shows the weight gain comparison of two smart gels in water with two different pHs.

Twelve different smart gel batches were synthesized and tested for swelling properties by carrying relative percentages of monomer and cross-linker with the trigger being pH. The particle size was controlled by the synthesis process. The smart gel example batches are given in the table below. Gels from batches 1 and 3 were shown to swell at pH values between 6 and 10 and 7 to 10 respectively. Weight gain after swelling for these two batches is shown in FIG. 4.

TABLE 2

Example compositions of a smart gel

| Monomer Ratio | Monomers | % fluorescent tag | % crosslinker |
|---|---|---|---|
| 1:1 | MMA:DMAEMA | 2 | 4 |
| 2:1 | MMA:DMAEMA | 0.2 | 7.6 |
| 1:3 | MMA:DMAEMA | 0.13 | 0.13 |
| 2:3 | MMA:DMAEMA | 0.1 | 2 |
| 1:1 | MMA:DMAEMA | 0.1 | 3.3 |
| 1:1 | MMA:2VP | 0.1 | 3.5 |

TABLE 2-continued

Example compositions of a smart gel

| Monomer Ratio | Monomers | % fluorescent tag | % crosslinker |
|---|---|---|---|
| 1:1 | MMA:2VP | 0.1 | 1 (DVB) |
| 1:1 | MMA:DMAEMA | 0.5 | 1 |
| 2:1 | MMA:DMAEMA | 0.5 | 1 |
| 1:2 | MMA:DMAEMA | 0.5 | 1 |
| 1:2 | MMA:2VP | 0.5 | 1 (DVB) |
| 2:1 | MMA:2VP | 0.5 | 1 (DVB) |

MA—Methyl methacrylate
MAEMA—2-(Dimethylamino) ethyl methacrylate
VP—2-Vinyl pyridine (alternative pH sensitive monomer)
NMA2-Napthyl methacrylate (fluorescent tag)
GDMA—Ethylene glycol dimethacrylate (crosslinker)
VB—Divinylbenzene (alternative crosslinker)

Figure 5:
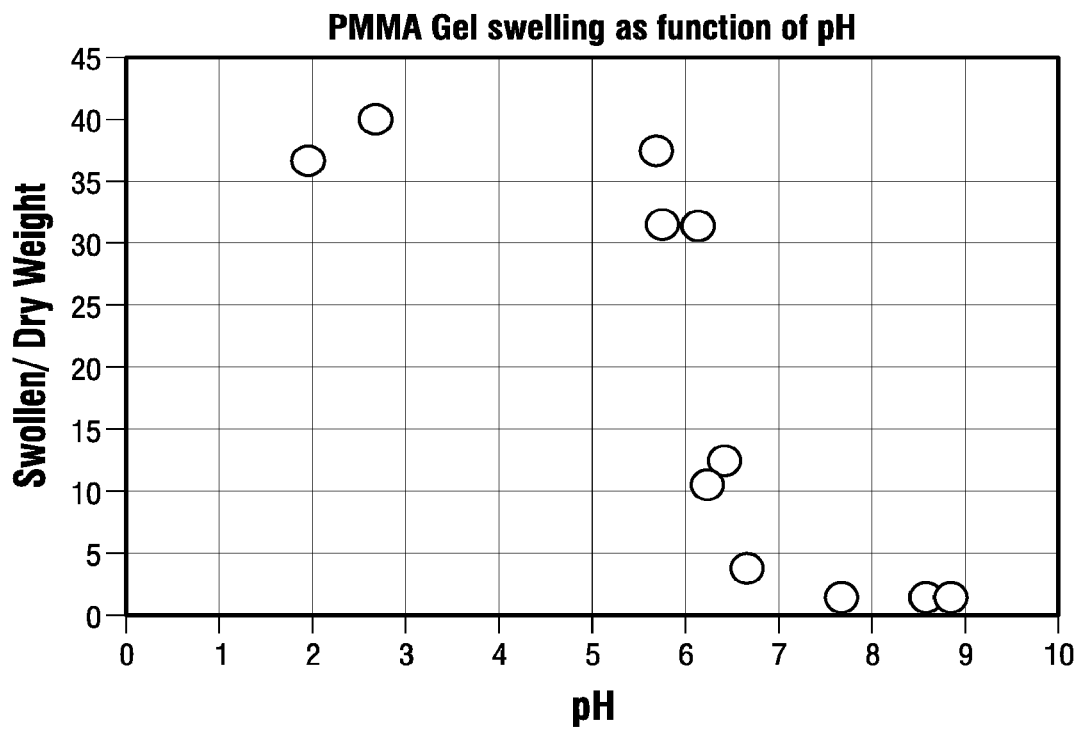
FIG. 5 illustrates a smart gel swelling as a function of pH.
Figure 6:
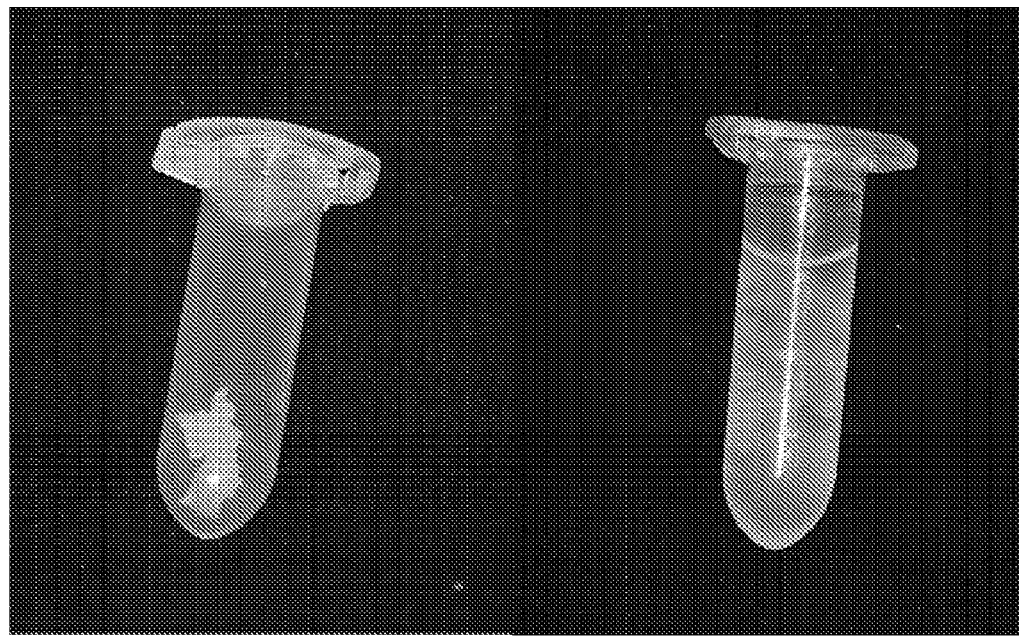
FIG. 6 is a photograph of the unswollen gel (left) and the swollen gel (right).
Figure 7:
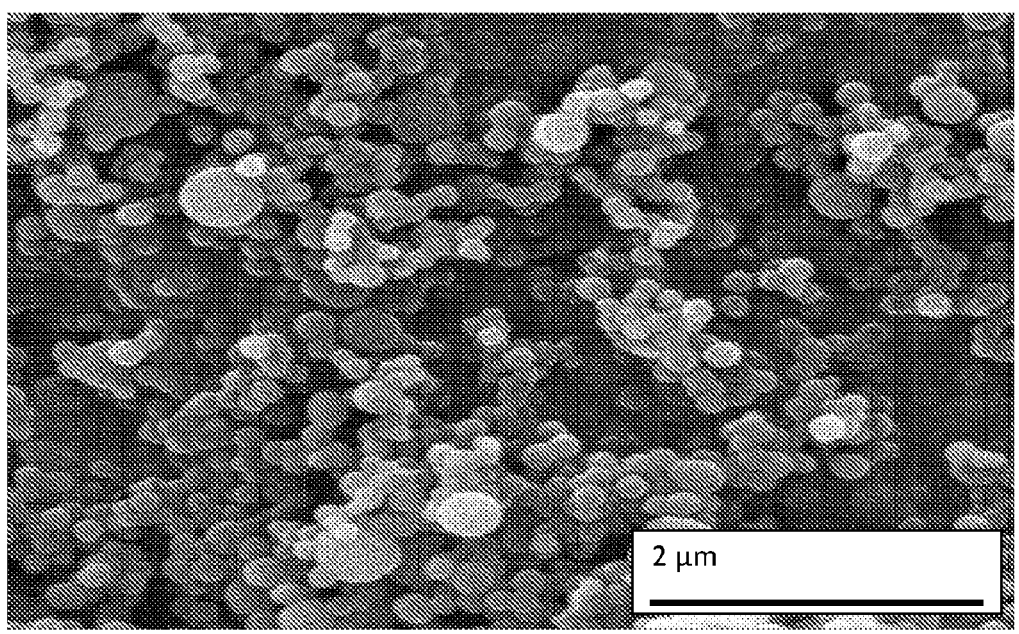
FIG. 7 is a scanning electron microscope image of gel particles.

Three additional gel batches beyond those above have been characterized including testing variable swelling properties as a function of pH. One such test is shown in FIG. 5, where a gel swelled up to 40 times its dry weight at pH below 6. Smart gel swelling and the reversible effect of collapsing were shown to be consistent in a temperature range from about 22° C. to 70° C. Particle size varied from 100 nm to 800 micrometers when collapsed. Particle size distributions were relatively narrow, and additional distributions could be achieved through mixing. FIG. 6 is a photograph of an unswollen gel on the left and the swollen gel on the right. Each vial is approximately 3 cm tall. FIG. 7 is a scanning electron microscope of the gel particles.

Figure 3:
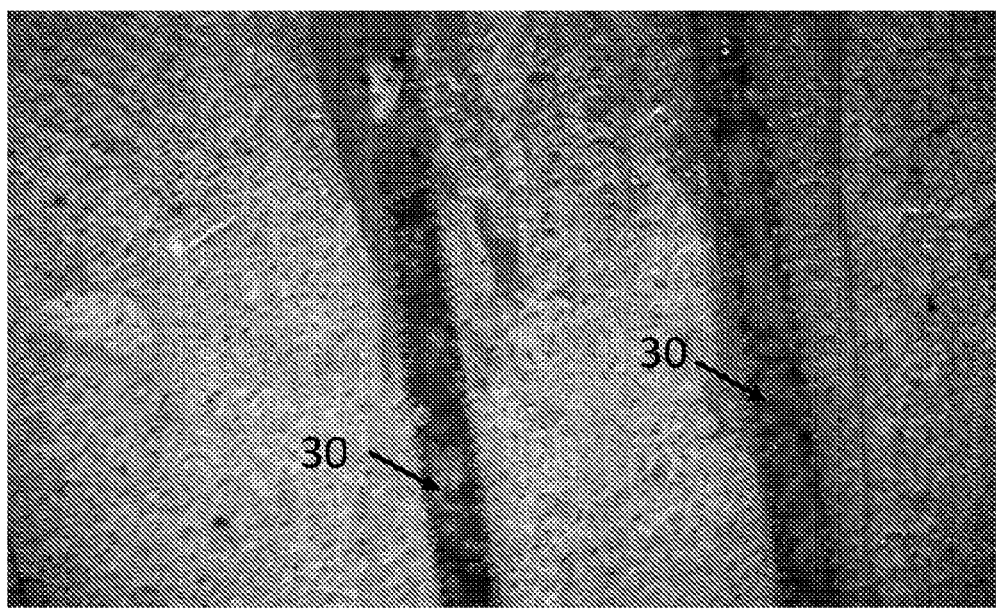
FIG. 3 is a photograph of two about 400 mm wide voids carved in cement. Both voids are clogged with smart gel in response to a pH change. The sealant is stained showing up dark gray. The dark gray can be seen both within the central voids and extending out into smaller fractures.

Several gel batches were tested in fabricated solid cement and glass micromodels with laser-etched microannulus and natural microannulus. The void thickness in the cement micromodels ranged from 100 micrometers to 3000 micrometers. Good visualization was achieved. FIG. 3 shows a photograph of a gel that was injected in its collapsed state into a solid cement micromodel comprising two voids 30 and then caused to swell by lowering the pH. The sealant was originally stained red but shows up as a uniform dark gray in the figure. The dark gray can be seen plugging both the central voids 30 and also plugging smaller fractures which extend out into the solid cement. For example, the dark gray line that runs from top to bottom to the right of the right void 30 is plugged with swollen gel particles. Swollen particles also plug the top of the left most void 30 and extend into fractures in the cement on the right and left at the top of the void 30. The swollen gel particles effectively plugged the channel and prevented fluid flow.

Example 2

A carbonic acid triggerable polymer was made with 38.2% Methyl methacrylate (MMA), 60.3% 2-(dimethylamino)ethyl methacrylate (DMAEMA), and 1.5% ethylene glycol dimethacrylate (EGDMA). Collapsed, these particles were opaque-white, and turned semi-translucent when swollen.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

REFERENCES

All references listed throughout the disclosure and below are incorporated herein by reference in full.

Bourgoyne, et al., 1999 Bourgoyne, Jr., Adam T., LSU; Scott, Stuart L., LSU; Manowski, Wojciech, Dowell-Schlumberger: "A Review of Sustained Casing Pressure (SCP) Occurring on the OCS", *LSU/MMS Well Control Workshop* (Apr. 1, 1998).

Goodman, H. E. 2012, "Taking control of subsurface behavior with Smart Gels—an oil & gas exploitation perspective", Goldschmidt Conference 2012, Montreal, Canada.

What is claimed is:

1. A method for permanently sealing a leakage pathway in a well comprising:
    injecting into the well a cement composition comprising cement aggregate, water, and a triggerable gel composition having an untriggered size and comprising a polymer, wherein the polymer comprises an inert monomer, a practical monomer, and less than 1.5% by weight of a cross-linker, wherein when the triggerable gel composition is exposed to at least one of carbonic acid and sulfuric acid, the triggerable gel composition swells to at least ten times the untriggered size, and wherein a permanent seal is formed within the leakage pathway by carbonate materials.

2. The method of claim 1, wherein the leakage pathway is located in one of: a casing of an active well or cement in a plugged and abandoned well.

3. The method of claim 1, further comprising injecting at least one of $CO_2$ and $H_2S$ into the well.

4. The method of claim 1, wherein the inert monomer is one or more of methyl methacrylate, styrene, alkyl substituted styrenes, methyl acrylate, methacrylic and acrylic monomers, acryloyl nitrile, polyvinylpyrolidinone, and a substituted acrylamide, and the practical monomer is one or more of 2-(dimethylamino) ethyl methacrylate, vinyl pyridine, 2-(diethylamino) ethyl acrylate, 3-(dimethylamino) propyl acrylate, and acrylic acid.

5. The method of claim 4, wherein the inert monomer is methyl methacrylate.

6. The method of claim 4, wherein the practical monomer is 2-(dimethylamino) ethyl methacrylate.

7. The method of claim 1, wherein the inert monomer is 5-80% by weight of the triggerable gel composition and the practical monomer is 5-80% by weight of the triggerable gel composition.

8. The method of claim 1, wherein the cross-linker is one or more of ethylene glycol dimethacrylate, methylene bisacrylamide, triethyleneglycol trimethacyrlate, and divinyl- or trivinyl benzene.

9. The method of claim 8, wherein the cross-linker is ethylene glycol dimethacrylate.

10. The method of claim 1, wherein the triggerable gel composition comprises gel particles with an average size between 10 nanometers and 150 micrometers prior to being triggered.

11. The method of claim 1, wherein, once the cement composition is cured to form a solid cement composition, the triggerable gel composition does not change the mechanical properties of the solid cement composition when the triggerable gel composition is in triggered form.

12. The method of claim 1, wherein the triggerable gel composition swells to at least 50 times the untriggered size when exposed to the at least one of carbonic acid and sulfuric acid.

13. The method of claim 1, wherein triggerable gel particles within the triggerable gel composition are encapsulated.

14. The method of claim 1, wherein a ratio of inert monomer to practical monomer is greater than 1:2.5.

15. The method of claim 1, wherein the cement composition further comprises calcium chloride.

16. A method of cementing a well during drilling operations comprising:
- drilling a section of the well in a formation;
- lowering a section of casing into the drilled section of the well;
- pumping down through the casing and up and around the casing into an annulus between the casing and the formation, a cement composition comprising cement aggregate, water, and a triggerable gel composition having an untriggered size, and comprising a polymer, wherein the polymer comprises an inert monomer, a practical monomer, and less than 1.5% by weight of a cross-linker, and wherein once the cement composition is cured it forms a solid cement composition; and
- wherein, when a leakage pathway forms in the solid cement composition, the triggerable gel composition is exposed to at least one of carbonic acid and sulfuric acid and thereby swells to at least ten times the untriggered size and forms a permanent seal within the leakage pathway with carbonate materials.

17. The method of claim 16, wherein, once the cement composition is cured to form the solid cement composition, the triggerable gel composition does not change the mechanical properties of the solid cement composition when the triggerable gel composition is in triggered form.

18. The method of claim 16, wherein a ratio of the inert monomer to the practical monomer is greater than 1:2.5.

* * * * *